(12) United States Patent
Enomoto

(10) Patent No.: US 6,224,265 B1
(45) Date of Patent: *May 1, 2001

(54) FLANGED BALL BEARING

(75) Inventor: Isao Enomoto, Tokyo (JP)

(73) Assignee: TOK Bearing Co., LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,696

(22) Filed: Feb. 2, 1999

(30) Foreign Application Priority Data

Feb. 10, 1998 (JP) .................................. 10-044541

(51) Int. Cl.$^7$ .................................... F16C 33/60

(52) U.S. Cl. ............................ 384/505; 384/513; 384/515

(58) Field of Search .................................. 384/499, 502, 384/505, 513, 515, 516, 537, 523, 526, 531

(56) References Cited

U.S. PATENT DOCUMENTS

| | | |
|---|---|---|
| 1,482,579 | 2/1924 | Nice . |
| 2,835,519 | 5/1958 | Spicacci et al. . |
| 3,080,731 * | 3/1963 | Atkinson .......................... 384/505 X |
| 3,807,818 * | 4/1974 | Donahue et al. ..................... 384/505 |
| 3,897,988 | 8/1975 | Dickinson et al. . |
| 4,048,702 | 9/1977 | Garnett . |
| 4,288,895 | 9/1981 | Campbell . |
| 4,362,344 * | 12/1982 | Lederman ........................ 384/499 X |
| 4,515,418 * | 5/1985 | Hogan .................... 384/502 |
| 4,550,237 | 10/1985 | Merkelbach . |
| 4,718,781 * | 1/1988 | Gerard ............. 384/505 X |
| 5,458,422 * | 10/1995 | Zernickel et al. ................... 384/505 |

FOREIGN PATENT DOCUMENTS

| | | |
|---|---|---|
| 1534897 | 6/1968 | (FR) . |
| 1581781 | 9/1969 | (FR) . |
| 564959 | 10/1944 | (GB) . |
| 1-210612 | 8/1989 | (JP) . |
| 07224840 | 8/1995 | (JP) . |
| 08061373 | 3/1996 | (JP) . |

OTHER PUBLICATIONS

"CB Flat Series", Published by Eastern Seiko Co., Ltd., Brochure, 2 pages, (Dec. 1990).

"Product List of DBS Press Bearing Nos. 1 and 2", Published by Daido Kogyo Co., Ltd., 2 pages, (Feb. 1984).

* cited by examiner

*Primary Examiner*—Thomas R. Hannon
(74) *Attorney, Agent, or Firm*—Schwegman, Lundberg, Woessner & Kluth, P.A.

(57) ABSTRACT

A flanged ball bearing has an inner race, an outer race made of sheet steel which is disposed around the inner race with an annular space defined therebetween, and a plurality of balls disposed in the annular space. The outer race has a flange extending radially outwardly. The inner race has a ball groove defined in an outer circumferential surface thereof. The outer race comprises a first annular member and a second annular member which are joined to each other. The first annular member has a first ball guide surface having an arcuate cross-sectional shape. The second annular member has a second ball guide surface having an arcuate cross-sectional shape. Each of the balls is rollingly supported by the first ball guide surface, the second ball guide surface, and the surface of the ball groove.

15 Claims, 5 Drawing Sheets

FLANGED BALL BEARING

BACKGROUND OF THE INVENTION

1. Field of the Invention

The present invention relates to a flanged ball bearing for use in various precision devices, office automation equipment, etc.

2. Description of the Related Art

It has been customary to manufacture miniature ball bearings and small-diameter ball bearings (hereinafter referred to as "small-size ball bearings") classified according to Japan Industrial Standard by a cutting process which is capable of easily achieving a desired level of dimensional accuracy. However, the cutting process fails to accomplish a greater reduction in the cost of manufacture of such small-size ball bearings.

Japanese laid-open patent publication No. 7-224840, for example, discloses a process of inexpensively manufacturing small-size ball bearings. According to the disclosed process, the outer race of a small-size ball bearing is produced by pressing a steel sheet to shape. For improving the load-resistance capability of small-size ball bearing, it is necessary to increase the thickness of a steel sheet that is pressed into the outer race. However, a steel sheet of increased thickness cannot easily be shaped by a spinning process. If the outer race of a small-size ball bearing is to be made of a steel sheet of increased thickness, then the process of forming the outer race will entail a substantial increase in the cost in order to achieve desired dimensional accuracy of the track of the outer race.

SUMMARY OF THE INVENTION

It is an object of the present invention to provide a flanged ball bearing which is highly resistant to loads on the outer race thereof, whose outer race can be manufactured without a substantial increase in the cost, and which meets desired dimensional accuracy requirements.

To achieve the above object, there is provided in accordance with the present invention a flanged ball bearing comprising an inner race, an outer race made of sheet steel, the outer race being disposed around the inner race with an annular space defined therebetween, the outer race having a flange extending radially outwardly, and a plurality of balls disposed in the annular space, the inner race having a ball groove defined in an outer circumferential surface thereof, the outer race comprising a first annular member and a second annular member which are joined to each other, the first annular member having a first ball guide surface having an arcuate cross-sectional shape, the second annular member having a second ball guide surface having an arcuate cross-sectional shape, each of the balls being rollingly supported by the first ball guide surface, the second ball guide surface, and the surface of the ball groove.

Since the balls are rollingly held in surface-to-surface contact with the two ball guide surfaces of the outer race and the surface of the ball groove, the balls have relatively large areas of contact with the outer and inner races. Furthermore, because the outer race comprises the two annular members, each of the annular members can easily be pressed to shape even if it has an increased wall thickness. As a result, the outer race can have an increased wall thickness for increased resistance to loads applied to the ball bearing.

A radial load is applicable along a radial central line passing through the center of each of the balls, and the inner race is held in contact with each of the balls in an axial contact range having opposite ends which are symmetrical with respect to the radial central line, and the outer race is held in contact with each of the balls in an axial contact range having opposite ends which are symmetrical with respect to the radial central line.

Therefore, even when a radial load in excess of a certain level is applied to the ball bearing, the balls roll stably, and the outer race is prevented from being reduced in durability. Accordingly, when a shaft fitted in the inner race rotates, the shaft does not produce vibrations and noise, and can be rotated smoothly.

The first annular member and the second annular member are joined by laser beam welding at radially outer ends thereof. Consequently, their joined and nearby areas are prevented from being deformed with heat and hence from being damaged, and it is possible to keep the dimensional accuracy of the outer race which has been achieved when the first and second annular members are produced by pressing.

The first annular member and the second annular member have respective portions joined to each other into the flange of the outer race.

The second annular member has the flange of the outer race, the first annular member having a radially outer end joined to a radially inner end of the flange.

The flanged ball bearing may further comprise a ring-shaped retainer disposed in the annular space and holding the balls out of contact with each other.

The first annular member may have a recess defined in a radially inner portion thereof, the ring-shaped retainer being insertable into and removable from the annular space through the annular space.

Each of the first annular member and the second annular member may be made of sheet steel pressed to shape.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
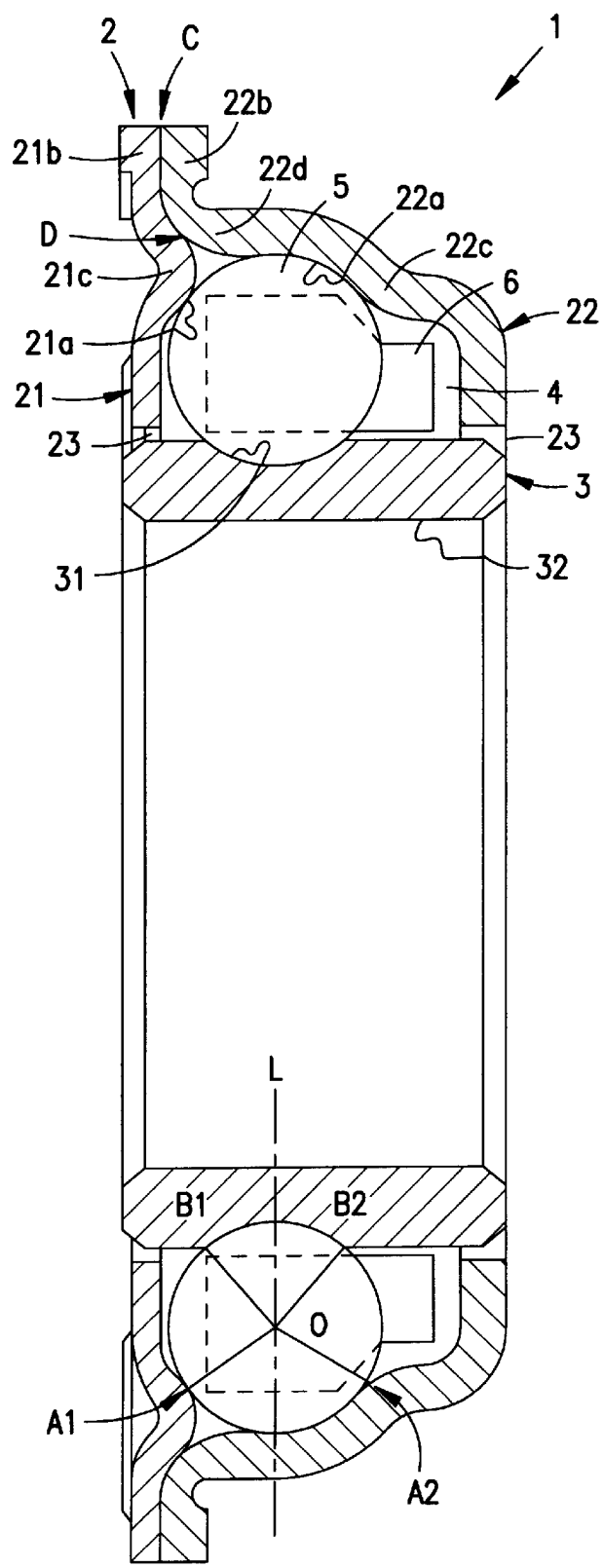
FIG. 1 is an axial cross-sectional view of a flanged ball bearing according to a first embodiment of the present invention.

As shown in FIG. 1, a flanged ball bearing 1 according to a first embodiment of the present invention comprises an inner race 3 in the form of a tubular member having a through hole 32 to be fitted over a shaft (not shown), an outer race 2 of sheet steel which comprises two annular members having respective through holes 23 that receive the inner race 3 therein, a plurality of balls 5 rollingly disposed in an annular space 4 defined between the inner race 3 and the outer race 2, and a ring-shaped retainer 6 holding the balls 5 in position. The ring-shaped retainer 6 may be dispensed with, as described later on.

The outer race 2 comprises a first annular member 21 and a second annular member 22. The first annular member 21 extends radially outwardly from a position near and just radially outside of an axial end of the outer circumferential surface of the inner race 3, and has an annular ridge 21c projecting axially inwardly (to the right in FIG. 1) from a substantially radially intermediate portion therof. The annular ridge 21c has an inner surface including a first ball guide surface 21a having an arcuate cross-sectional shape. The first ball guide surface 21a is complementary in shape to a partly spherical surface (an upper left surface in FIG. 1) of each of the balls 5. This partly spherical surface of each of the balls 5 is thus snugly held against the first ball guide surface 21a.

The second annular member 22 extends radially outwardly from a position near and just radially outside of an opposite axial end of the outer circumferential surface of the inner race 3, and also extends radially outwardly and axially inwardly (to the left in FIG. 1) toward a radially outer end of the first annular member 21. The second annular member 22 has two annular ridges 22c, 22d projecting radially inwardly and also has an inner surface including a second ball guide surface 22a having an arcuate cross-sectional shape. The second ball guide surface 22a is complementary in shape to a partly spherical surface (ranging from an upper right surface to an uppermost surface in FIG. 1) of each of the balls 5. This partly spherical surface of each of the balls 5 is thus snugly held against the second ball guide surface 22a.

The first annular member 21 and the second annular member 22 are not limited to the shapes shown in FIG. 1, and the first and second ball guide surfaces 21a, 22a are not limited to the positions shown in FIG. 1. The sheet steel of each of the first annular member 21 and the second annular member 22 is not limited to any compositions, but may be stainless steel, cold-rolled steel, etc.

The first annular member 21 has a radially outer end 21b serving as a flange, and the second annular member 22 also has a radially outer end 22b serving as a flange. The flange 22b has an inner surface complementary in shape to and held against an inner surface of the flange 21b. The first annular member 21 and the second annular member 22 are joined to each other at these flanges 21b, 22b. Specifically, the flanges 21b, 22b extend from a region C to a region D of the first annular member 21 and the second annular member 22, and may be joined to each other in at least a portion of their inner surfaces that are complementarily held against each other. For example, the flanges 21b, 22b may be joined to each other near the region C which is located at the radially outer edges of the flanges 21b, 22b, or near the region D which is located at the radially innermost edges of the flanges 21b, 22b, or somewhere between the regions C, D, or entirely between the regions C, D.

The flanges 21b, 22b may be joined to each other by fusion, welding, or the like. If the flanges 21b, 22b are welded to each other, they may be welded by any of various welding processes including resistance welding, electron beam welding, etc. However, the flanges 21b, 22b should preferably be welded by laser beam welding in order to prevent their joined and nearby areas from being deformed with heat and hence from being damaged. If the flanges 21b, 22b are welded by laser beam welding, then it is possible to keep the dimensional accuracy of the outer race 2 which has been achieved when sheet steels are pressed into the first and second annular members 21, 22.

The first annular member 21 and the second annular member 22 which are joined to each other at their flanges 21b, 22b serve to seal the annular space 4 against leakage of a grease filled in the annular space 4. Since the grease filled in the annular space 4 is prevented from leaking out, the balls 5 are prevented from rotating unstably and from causing noise which would otherwise be produced if the balls 5 rotated unstably.

The radial load resistance of a ball bearing is determined by the thickness of the sheet steel of the outer race thereof. For example, if the small-size ball bearing disclosed in Japanese laid-open patent publication No. 7-224840 has an inner race inside diameter of 8 mm, an outer race outside diameter of 16 mm, and a bearing width of 5 mm, for example, then the small-size ball bearing has a radial load resistance of 2 kgf when the sheet steel of the outer race has a thickness of 0.4 mm. If the sheet steel of the outer race has a greater thickness, then the process of forming the outer race will be correspondingly more costly.

According to the present invention, if the flanged ball bearing has the same inner race inside diameter, outer race outside diameter, and bearing width as those of the small-size ball bearing disclosed in Japanese laid-open patent publication No. 7-224840, then the second annular member 22 shown in FIG. 1 can have an increased wall thickness ranging from 0.5 mm to 0.8 mm, and hence the flanged ball bearing has an increased radial load resistance of 4 kgf or more.

The inner race 3 comprises a tubular member of metal, and has an annular ball groove 31 defined in an outer circumferential surface thereof. The annular ball groove 31 has a surface which is complementary in shape to a partly spherical surface (a lower surface in FIG. 1) of each of the balls 5. This partly spherical surface of each of the balls 5 is thus snugly held against the surface of the annular ball groove 31. The material of the inner race 3 is not limited to metal, but may be plastics, ceramics, etc.

Each of the balls 5 is rollingly held in surface-to-surface contact with the first ball guide surface 21a and the second ball guide surface 22a of the outer race 2 and the surface of the ball groove 31 of the inner race 3. Since each of the balls 5 is held in surface-to-surface contact, but not point-to-point contact, with these three surfaces, even when a large load is applied to the ball bearing, the load applied per unit area is relatively small. Because the outer race 2 has two ball contact surfaces, the outer race 2 in particular is highly resistant to loads applied to the ball bearing.

Rolling contact between the inner and outer races 3, 2 and the balls 5 will be described below. As shown in FIG. 1, the inner race 3 and each of the balls 5 are held in rolling contact with each other in an axial contact range from a point $B_1$ to a point $B_2$. If a radial load is applied to the ball bearing along a radial central line L extending through the center O of the ball 5, then the point $B_1$ and the point $B_2$, positioned respectively at the opposite ends of the contact range, are symmetrical with respect to the radial central line L. The outer race 2 and each of the balls 5 are held in rolling contact with each other in an axial contact range from a point $A_1$ to a point A₂. The point A₁ and point A₂, positioned respectively at the opposite ends of the contact range, are also symmetrical with respect to the radial central line L.

Therefore, not only the points of contact between the inner race 3 and the balls 5 are symmetrical with respect to the radial central line L, but also the points of contact between the outer race 2 and the balls 5 are symmetrical with respect to the radial central line L.

As a consequence, even when a radial load in excess of a certain level is applied to the ball bearing, the balls 5 thus held in rolling contact with the inner and outer races 3, 2 are prevented from rolling unstably, and the outer race 2 is prevented from being reduced in durability. Accordingly, when the shaft fitted in the inner race 3 rotates, the shaft does not produce vibrations and noise, and can be rotated smoothly.

The outer race 2 is made up of the two members, i.e., the first annular member 21 and the second annular member 22. Even if each of the first annular member 21 and the second annular member 22 is made of sheet steel having a wall thickness greater than 0.4 mm, they can easily individually be pressed to shape with highly dimensional accuracy, thus producing the outer race 2 as desired. Since each of the first annular member 21 and the second annular member 22 can have an increased wall thickness, the outer race 2 is made highly resistance to loads on the ball bearing.

The ring-shaped retainer 6 is capable of holding six to twelve balls 5. The ring-shaped retainer 6 is effective to prevent adjacent ones of the balls 5 from contacting and physically interfering with each other, from being unduly worn, and from failing to roll due to physical interference with each other.

The ring-shaped retainer 6 has an outer circumferential surface substantially complementary in shape to the inner circumferential surface of the second annular member 22.

The ring-shaped retainer 6 may be made of any of various materials, but should preferably be made of a synthetic resin such as polypropylene, polyamide, or the like, for example.

Figure 2:
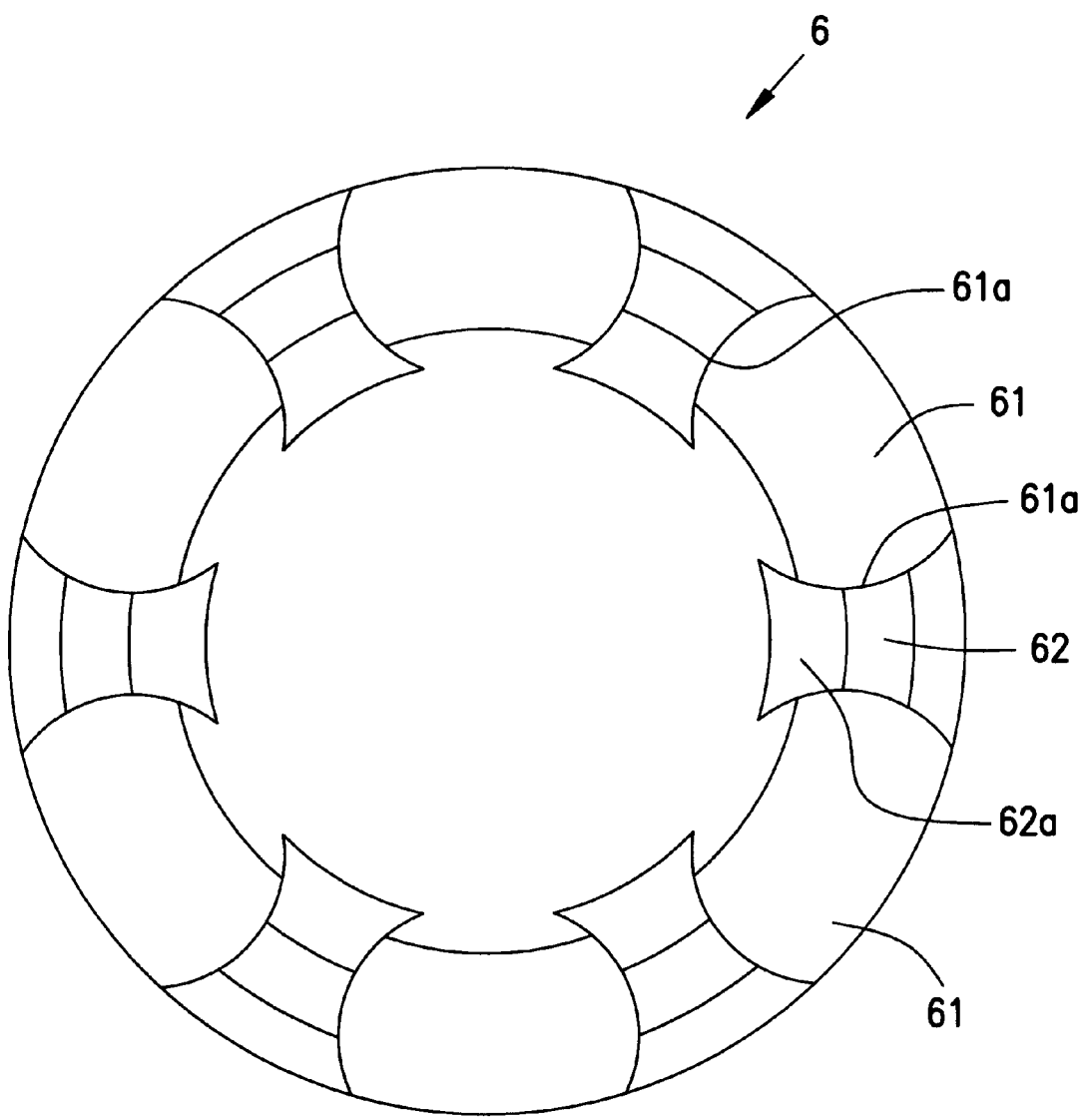
FIG. 2 is a plan view of a retainer in the flanged ball bearing according to the first embodiment of the present invention.

As shown in FIG. 2, the ring-shaped retainer 6, which is designed to hold six balls 5, has six circumferentially equally spaced recesses 61 each defined between two concave wall surfaces 61*a* which are substantially complementary in shape to partly spherical surfaces of a ball 5. The balls 5 are held in the respective recesses 61. The recesses 61 are spaced by spacers 62 which are also circumferentially equally spaced. The spacers 62 have respective radially inner ends 62*a* engaging in the annular ball groove 31 of the inner race 3.

With the ring-shaped retainer 6 placed in the annular space 4 between the inner race 3 and the outer race 2, the spacers 62 are positioned between the balls 5 held in the respective recesses 61, holding the balls 5 equally spaced apart. The radially inner ends 62*a* of the spacers 62 engage in the annular ball groove 31 to prevent the ring-shaped retainer 6 from being displaced in the annular space 4.

The ring-shaped retainer 6 may be designed to hold more balls 5, and is not limited to the structure shown in FIG. 2.

The balls 5 may be made of plastics, ceramics, metal, etc. If the balls 5 are made of metal, then they should preferably be made of chromium steel, carbon steel, or the like.

Figure 3A:
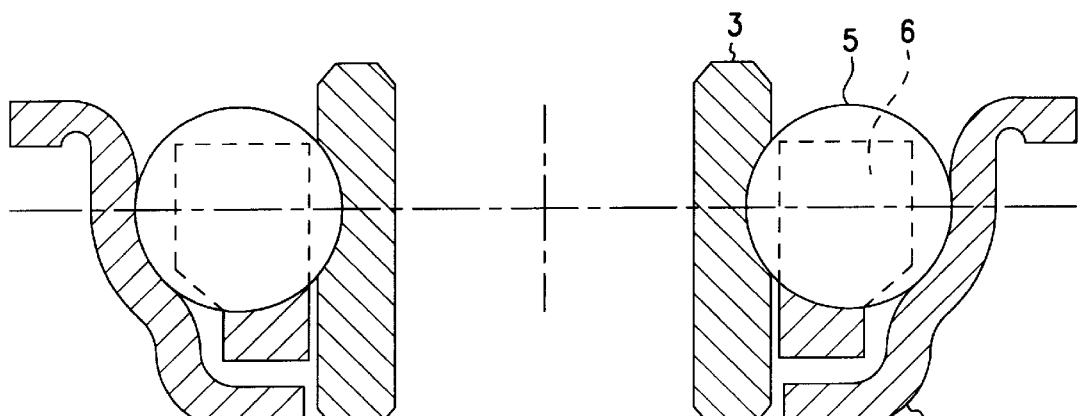
FIGS. 3A, 3B, and 3C are axial cross-sectional views illustrative of a process of assembling the flanged ball bearing according to the first embodiment of the present invention.
Figure 3B:
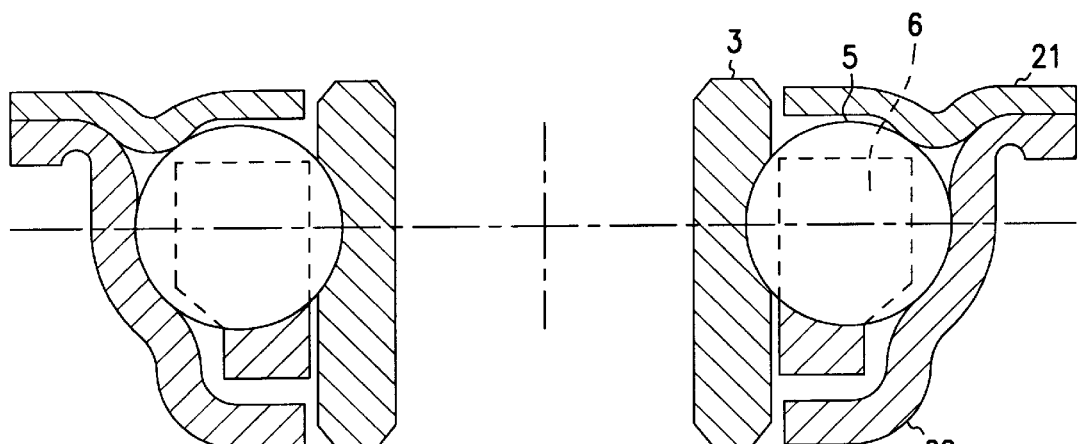

The flanged ball bearing according to the present invention is assembled as follows: As shown in FIGS. 3A and 3B, the inner race 3, the balls 5, the ring-shaped retainer 6, and a grease (not shown) are inserted into the second annular member 22 of the outer race 2, and then the balls 5, the ring-shaped retainer 6, and the grease are covered with the first annular member 21.

Figure 3C:
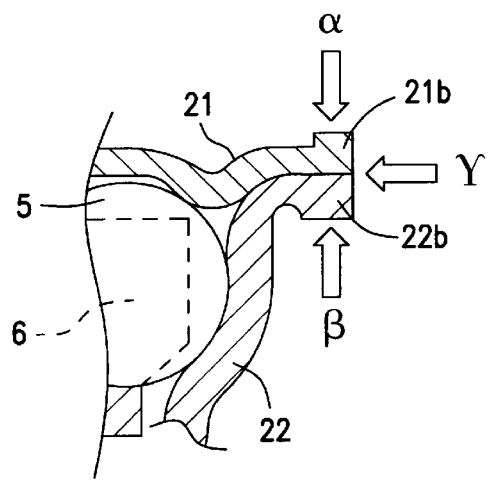

Finally, the flange 21*b* of the first annular member 21 and the flange 22*b* of the second annular member 22 are welded to each other, sealing the annular space 4. Though the flanges 21*b*, 22*b* may be welded in any arbitrary directions, they should be welded in directions indicated by the arrows α, β, γ, as shown in FIG. 3C.

Figure 4:
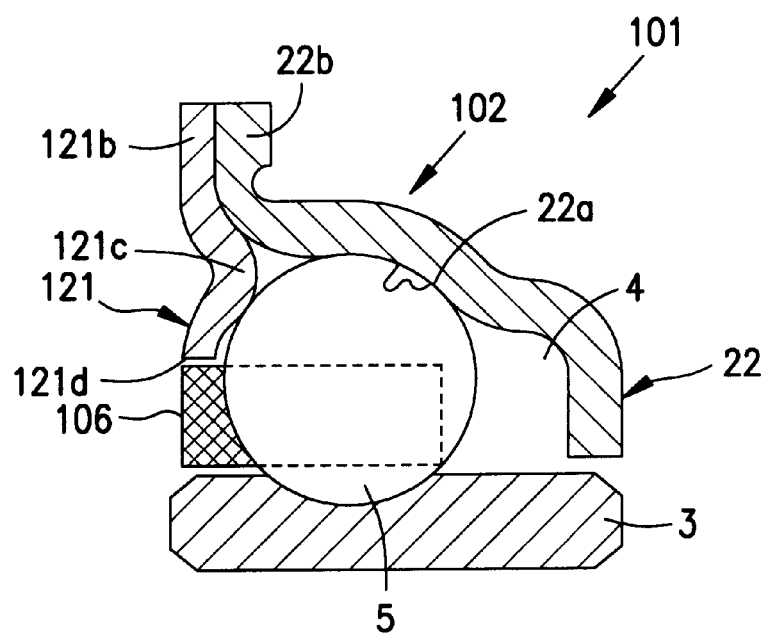
FIG. 4 is a fragmentary axial cross-sectional view of a flanged ball bearing according to a second embodiment of the present invention.

FIG. 4 shows in fragmentary axial cross section a flanged ball bearing 101 according to a second embodiment of the present invention. Those parts of the flanged ball bearing 101 which are identical to those of the flanged ball bearing 1 shown in FIG. 1 are denoted by identical reference characters, and will not be described in detail below.

The flanged ball bearing 101 shown in FIG. 4 differs from the flanged ball bearing 1 shown in FIG. 1 in that an outer race 102 has a first annular member 121 including an annular recess 121*d* extending radially outwardly from a position near and just radially outside of an axial end of the outer circumferential surface of the inner race 3, to an annular ridge 121*c* projecting axially inwardly (to the right in FIG. 1) from a substantially radially intermediate portion of the first annular member 121. Therefore, the annular space 4 is not sealed by the first and second annular members 121, 22, but is partly open axially through the annular recess 121*d*. The first annular member 121 has a radially outer end 121*b* serving as a flange and welded to the flange 22*b* of the second annular member 22.

A ring-shaped retainer 106 thus disposed in the annular space 4 is of a rectangular cross-sectional shape, and has an axial end positioned in the annular recess 121*d*. The ring-shaped retainer 106 thus has an outer circumferential surface which is flat, but not complementary in shape to the inner circumferential surface of the second annular member 22. The ring-shaped retainer 106 can be removed from the annular space 4 through the annular recess 121*d* for replacement.

The flanged ball bearing 101 according to the second embodiment can be assembled by joining the first annular member 121 and the second annular member 22 to each other into the outer race 102, placing the balls 5, the inner race 3, and a grease in the outer race 102, and then inserting the ring-shaped retainer 106 into the annular space 4 through the annular recess 121*d*.

Figure 5:
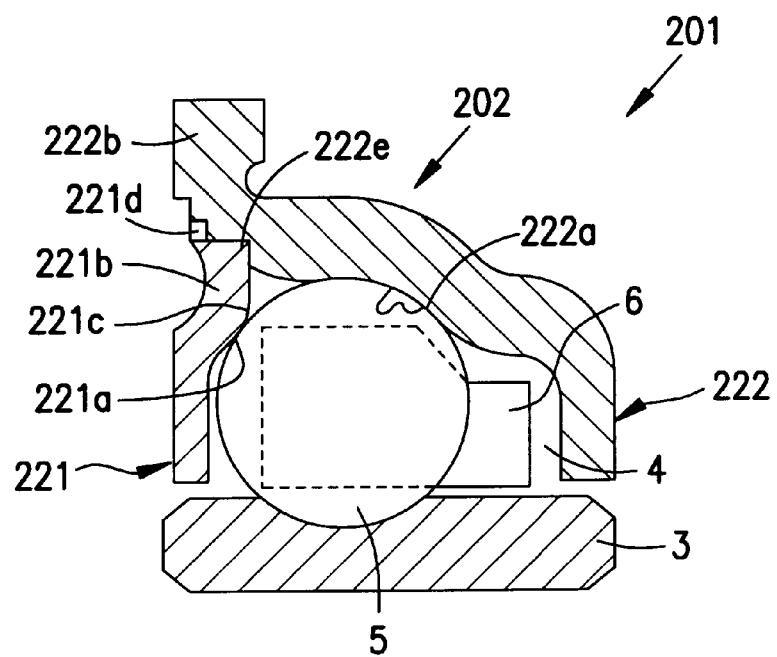
FIG. 5 is a fragmentary axial cross-sectional view of a flanged ball bearing according to a third embodiment of the present invention.

FIG. 5 shows in fragmentary axial cross section a flanged ball bearing 201 according to a third embodiment of the present invention. Those parts of the flanged ball bearing 201 which are identical to those of the flanged ball bearing 1 shown in FIG. 1 are denoted by identical reference characters, and will not be described in detail below.

The flanged ball bearing 201 has an outer race 202 comprising a first annular member 221 and a second annular member 222. The first annular member 221 extends radially outwardly from a position near and just radially outside of an axial end of the outer circumferential surface of the inner race 3, and has an annular ridge 221*c* projecting axially inwardly (to the right in FIG. 5) and a radially outer end 221*b* adjacent to the annular ridge 221*c*. The radially outer end 221*b* ha a radially outer end face 221*d* extending parallel to the axis of the ball bearing 201. The annular ridge 221*c* has an inner surface including a first ball guide surface 221*a* snugly held against a partly spherical surface of each of the balls 5.

The second annular member 222 extends radially outwardly from a position near and just radially outside of an opposite axial end of the outer circumferential surface of the inner race 3, and also extends radially outwardly and axially inwardly (to the left in FIG. 5) toward a position immediately radially outwardly of the radially outer end 221b of the first annular member 21. The second annular member 22 has an inner surface including a second ball guide surface 222a snugly held against a partly spherical surface of each of the balls 5. The second annular member 222 has a radially outer end 222b serving as a flange. The flange 222b extends radially outwardly of the radially outer end 221b of the first annular member 221. The flange 222b has a radially inner end face 222e extending parallel to the axis of the ball bearing 201 and held in intimate contact with the radially outer end face 221d of the radially outer end 221b of the first annular member 21. The first and second annular members 221, 222 are welded to each other at the end faces 221d, 222e.

With the structure shown in FIG. 5, it is possible to increase the wall thickness of the second annular member 222 to 1.2 mm. If the wall thickness of the second annular member 222 is of 1.2 mm, then the ball bearing 201 has a radial load resistance of 8 kgf or more.

Figure 6:
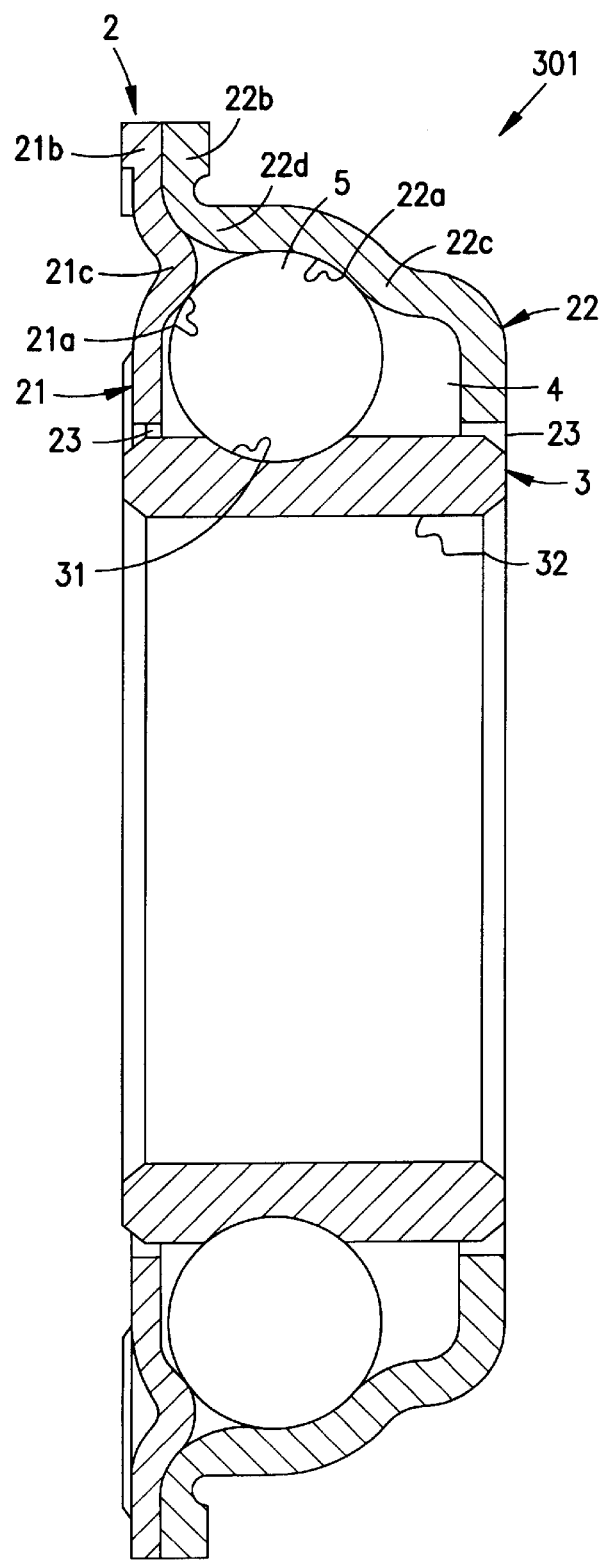
FIG. 6 is an axial cross-sectional view of a flanged ball bearing according to a fourth embodiment of the present invention.

FIG. 6 shows in axial cross section a flanged ball bearing 301 according to a fourth embodiment of the present invention. Those parts of the flanged ball bearing 301 which are identical to those of the flanged ball bearing 1 shown in FIG. 1 are denoted by identical reference characters, and will not be described in detail below.

The flanged ball bearing 301 shown in FIG. 6 differs from the flanged ball bearing 1 shown in FIG. 1 in that the flanged ball bearing 301 is devoid of the ring-shaped retainer 6 shown in FIG. 1.

The parts of the flanged ball bearing 301 can be assembled and welded together in the same manner as described above with respect to the flanged ball bearing 1 shown in FIG. 1.

Although certain preferred embodiments of the present invention have been shown and described in detail, it should be understood that various changes and modifications may be made therein without departing from the scope of the appended claims.

What is claimed is:

1. A one-sided flange type ball bearing comprising:
   an inner race formed by a single member, wherein the inner race has an annular ball groove defined in an outer circumferential surface thereof;
   an outer race made of sheet steel, wherein the outer race is formed by a pair of asymmetrical annular members, wherein the outer race is disposed around the inner race with an annular space defined therebetween, wherein the outer race has a flange extending radially outwardly, and wherein the outer race comprises a first annular member and a second annular member that are joined to each other, the first annular member having a first ball guide surface having an arcuate cross-sectional shape, the second annular member having a second ball guide surface having an arcuate cross-sectional shape; and
   a plurality of balls disposed in the annular space; each of the balls being rollingly supported by the first ball guide surface, the second ball guide surface, and a surface of the ball groove;
   wherein the bearing has two points of contact with balls on the first and second ball guide surfaces of the pair of annular members of the outer race and one curvilinear contact with the balls along the annular ball groove of the inner race.

2. A flanged ball bearing according to claim 1, wherein a radial load is applicable along a radial central line passing through the center of each of the balls, and wherein said inner race is held in contact with each of said balls in an axial contact range having opposite ends which are symmetrical with respect to said radial central line, and said outer race is held in contact with each of said balls in an axial contact range having opposite ends which are symmetrical with respect to said radial central line.

3. A flanged ball bearing according to claim 1, wherein said first annular member and said second annular member are joined by laser beam welding at radially outer ends thereof.

4. A flanged ball bearing according to claim 3, wherein said second annular member has said flange of the outer race, said first annular member having a radially outer end joined to a radially inner end of said flange.

5. A flanged ball bearing according to claim 1, wherein said first annular member and said second annular member have respective portions joined to each other into said flange of the outer race.

6. A flanged ball bearing according to claim 1, further comprising a ring-shaped retainer disposed in said annular space and holding said balls out of contact with each other.

7. A flanged ball bearing according to claim 6, wherein said first annular member has a recess defined in a radially inner portion thereof, said ring-shaped retainer being insertable into and removable from said annular space through said annular space.

8. A flanged ball bearing according to claim 1, wherein each of said first annular member and said second annular member is made of sheet steel pressed to shape.

9. A one-sided flange type ball bearing comprising:
   an inner race formed by a single member, wherein the inner race has an annular ball groove defined in an outer circumferential surface thereof;
   an outer race made of sheet steel, wherein the outer race is formed by a pair of asymmetrical annular members, wherein the outer race is disposed around the inner race with an annular space defined therebetween, wherein the outer race has a flange extending radially outwardly, and wherein the outer race comprises a first annular member and a second annular member that are joined to each other, the first annular member having a first ball guide surface having an arcuate cross-sectional shape, the second annular member having a second ball guide surface having an arcuate cross-sectional shape; wherein the first annular member and the second annular member are joined by laser beam welding at radially outer ends thereof; wherein the second annular member has the flange of the outer race, the first annular member having a radially outer end joined to a radially inner end of the flange; and
   a plurality of balls disposed in the annular space; each of the balls being rollingly supported by the first ball guide surface, the second ball guide surface, and a surface of the ball groove;
   wherein the bearing has two points of contact with balls on the first and second ball guide surfaces of the pair of annular members of the outer race and one curvilinear contact with the balls along the annular ball groove of the inner race.

10. A flange ball bearing comprising:
    an inner race having a ball groove defined in an outer circumferential surface thereof;
    an outer race made of sheet steel, the outer race being disposed around the inner race with an annular space defined therebetween, the outer race having a flange extending radially outwardly, the outer race comprising a first annular member and a second annular member which are joined to each other, the first annular member having a first ball guide surface having an arcuate cross-sectional shape, the second annular member having a second ball guide surface having an arcuate cross-sectional shape, wherein the first annular member and the second annular member are joined by laser beam welding at radially outer ends thereof, wherein the second annular member has the flange of the outer race, the first annular member having a radially outer end joined to a radially inner end of the flange; and a plurality of balls disposed in the annular space, each of the balls being rollingly supported by the first ball guide surface, the second ball guide surface, and a surface of the ball groove.

11. A flanged ball bearing according to claim 10, wherein a radial load is applicable along a radial central line passing through the center of each of the balls, and wherein the inner race is held in contact with each of the balls in an axial contact range having opposite ends which are symmetrical with respect to the radial central line, and the outer race is held in contact with each of the balls in an axial contact range having opposite ends which are symmetrical with respect to said radial central line.

12. A flanged ball bearing according to claim 10, wherein said first annular member and the second annular member have respective portions joined to each other in to the flange of the outer race.

13. A flanged ball bearing according to claim 10, further comprising a ring-shaped retainer disposed in the annular space and holding the balls out of contact with each other.

14. A flanged ball bearing according to claim 13, wherein the first annular member has a recess defined in a radially inner portion thereof, the ring-shaped retainer being insertable into and removable from the annular space through the annular space.

15. A flanged ball bearing according to claim 10, wherein each of the first annular member and the second annular member is made of sheet steel pressed to shape.

\* \* \* \* \*